United States Patent
Adam et al.

(10) Patent No.: US 11,729,072 B2
(45) Date of Patent: Aug. 15, 2023

(54) METHOD AND APPARATUS FOR SLA MANAGEMENT IN DISTRIBUTED CLOUD ENVIRONMENTS

(71) Applicant: Nokia Solutions and Networks Oy, Espoo (FI)

(72) Inventors: Iris Adam, Munich (DE); Jing Ping, Chengdu (CN); Stephane Mahieu, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 116 days.

(21) Appl. No.: 16/644,146

(22) PCT Filed: Sep. 5, 2017

(86) PCT No.: PCT/CN2017/100592
§ 371 (c)(1),
(2) Date: Mar. 3, 2020

(87) PCT Pub. No.: WO2019/047030
PCT Pub. Date: Mar. 14, 2019

(65) Prior Publication Data
US 2021/0067419 A1 Mar. 4, 2021

(51) Int. Cl.
  G06F 15/16 (2006.01)
  H04L 41/5019 (2022.01)
  H04L 67/10 (2022.01)
(52) U.S. Cl.
  CPC .......... H04L 41/5019 (2013.01); H04L 67/10 (2013.01)
(58) Field of Classification Search
  CPC .......................... H04L 41/5019; H04L 67/10
  (Continued)

(56) References Cited

U.S. PATENT DOCUMENTS 8,069,242 B2  11/2011  Hadar et al.
8,959,195 B1  2/2015  Niranjan et al.
(Continued)

FOREIGN PATENT DOCUMENTS

CN  1703877 A  11/2005
CN  103067344 A  4/2013
(Continued)

OTHER PUBLICATIONS

Extended European Search Report received for corresponding European Patent Application No. 17924274.8, dated Dec. 11, 2020, 8 pages.
(Continued)

*Primary Examiner* — Suraj M Joshi
*Assistant Examiner* — Joel Mesa
(74) *Attorney, Agent, or Firm* — Lippes Mathias LLP (57) ABSTRACT

Methods and apparatus are provided for Service Level Agreement managements in distributed cloud environments. A method comprises monitoring enforcements of Service Level Agreements for services provided to a plurality of tenants by a cloud provider; detecting a possible Service Level Agreement violation for a service provided to one tenant of the plurality of tenants, wherein the possible Service Level Agreement violation is related to performance or security requirements; and automatically mitigating the possible Service Level Agreement violation with cooperation with at least one of a cloud manager and a security management system of the cloud provider. The possible Service Level Agreement violation can involve a possible confliction between performance requirements and security requirements, and mitigating the possible Service Level Agreement violation comprises resolving the possible confliction for self-healing. Methods for an automatic Service Level Agreement update is also provided.

23 Claims, 5 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2013/0036449 | A1 | 2/2013 | Mukkara et al. |
| 2013/0066940 | A1 | 3/2013 | Shao |
| 2013/0097304 | A1 | 4/2013 | Asthana et al. |
| 2013/0204650 | A1 | 8/2013 | Sabharwal |
| 2013/0297655 | A1 | 11/2013 | Narasayya et al. |
| 2014/0317166 | A1 | 10/2014 | Iyoob et al. |
| 2015/0081917 | A1 | 3/2015 | Ferris et al. |
| 2015/0134618 | A1 | 5/2015 | Teterin et al. |
| 2015/0142950 | A1* | 5/2015 | Anderson .......... H04L 41/5006 709/224 |
| 2016/0300142 | A1* | 10/2016 | Feller .................... G06N 20/00 |
| 2017/0104651 | A1 | 4/2017 | Kakadia et al. |

FOREIGN PATENT DOCUMENTS

| | | |
|---|---|---|
| CN | 103875210 A | 6/2014 |
| CN | 104660669 A | 5/2015 |
| CN | 104714847 A | 6/2015 |
| CN | 106663035 A | 5/2017 |
| EP | 3038291 A1 | 6/2016 |
| WO | WO-2009029811 A2 * 3/2009 ....... G06F 17/30221 |
| WO | 2016/060595 A1 | 4/2016 |

OTHER PUBLICATIONS

Basilier et al., "Virtualizing Network Services—the Telecom Cloud", Ericsson Review, Mar. 28, 2014, pp. 1-10.

Vajda et al., "Cloud Computing and Telecommunications: Business Opportunities, Technologies and Experimental Setup", World Telecommunications Congress, Mar. 5-6, 2012, 6 pages.

Antonescu et al., "Service Level Agreements-Driven Management of Distributed Applications in Cloud Computing Environments", IFIP/IEEE International Symposium on Integrated Network Management (IM), May 11-15, 2015, pp. 1122-1128.

Mazmanov et al., "Handling Performance Sensitive Native Cloud Applications with Distributed Cloud Computing and SLA Management", IEEE/ACM 6th International Conference on Utility and Cloud Computing, Dec. 9-12, 2013, pp. 470-475.

Lee et al., "A Design Space for Dynamic Service Level Agreements in OpenStack", Journal of Cloud Computing, 2014, pp. 1-13.

Ullah et al., "Demo Paper: Automatic Provisioning, Deploy and Monitoring of Virtual Machines Based on Security Service Level Agreement in the Cloud", 14th IEEE/ACM International Symposium on Cluster, Cloud and Grid Computing, May 26-29, 2014, pp. 536-537.

Wu, "SLA-based Resource Provisioning for Management of Cloud-based Software-as-a-Service Applications", Thesis, Mar. 2014, 193 pages.

International Search Report and Written Opinion received for corresponding Patent Cooperation Treaty Application No. PCT/CN2017/100592, dated Jun. 4, 2018, 9 pages.

* cited by examiner

METHOD AND APPARATUS FOR SLA MANAGEMENT IN DISTRIBUTED CLOUD ENVIRONMENTS

RELATED APPLICATION

This application was originally filed as Patent Cooperation Treaty Application No. PCT/CN2017/100592 filed Sep. 5, 2017.

FIELD OF THE INVENTION

The present invention generally relates to Service Level Agreement (SLA) management in cloud environments. More specifically, the invention relates to systems, apparatus, and methods for managing SLA in distributed cloud environments.

BACKGROUND

As the market of cloud services is continuing to grow, people focus on more than the availability of cloud services. They want to know whether cloud service providers can deliver better services to consumers, which is also called "tenants" in cloud services. In some cases, the violation of SLAs may lead to reputation issues and penalties. Therefore, the cloud service providers have to pay more attention to SLA management.

Today, many telecom services and enterprises' real-time services have strong requirements for end-to-end performance. Additionally, the 5G (fifth-Generation) communication technology will bring applications with very high bandwidths and very low-latency requirements, e.g. advanced video systems, real-time IoT (Internet of Things) and the like. For example, an application of telerobotics and teleoperation would have strong latency requirements for controlling semi-autonomous robots from a distance via wireless networks, e.g. for usages in hospitals and in home-care. In applications of automated driving, cooperated driving and sensor enabled traffic safety, bandwidths and latency requirements would be critical.

In the parallel, security is a big concern in the 5G network where additional resources are required to fulfill the strict security requirements, #uch as regulation compliance, response time to incident, vulnerability score, etc. The tenants are dependent on the security mechanisms that service providers have in effect. For example, they have to trust the cloud service providers to protect against attacks from outsiders and insiders (e.g. from other tenants). Thus, "security SLAs" are needed to address tenants' concerns regarding security of their data, e.g. measures against DDoS (Distributed Denial of Service) attacks and malware, response time to security incidents, and so on.

In future, the cloud service providers will be responsible to guarantee all tenants' SLAs. Conflicts between performance SLAs and security SLAs may arise during deployments of cloud services as well as during run-time of cloud services, e.g. while mitigating incidents or mitigating SLA-violations. For example, a conflict may arise between a latency requirement and an intrusion detection requirement. Thus, the cloud service providers need both automatic enforcement mechanisms for SLAs and a comprehensive conflict management to prevent SLA violations.

SOME EXAMPLE EMBODIMENTS

To overcome the problem described above, and to overcome the limitations that will be apparent upon reading and understanding the prior arts, the disclosure provides an approach for SLA managements in distributed cloud environments.

According to a first aspect of the present invention, a method comprises monitoring enforcements of SLAs for services provided to a plurality of tenants by a cloud provider; detecting a possible SLA violation for a service provided to one tenant of the plurality of tenants, wherein the possible SLA violation is related to performance or security requirements; deciding whether to trigger a cloud manager or a security management system of the cloud provider to mitigate the possible SLA violation; and automatically mitigating the possible SLA violation with cooperation with at least one of a cloud manager and a security management system of the cloud provider. In an exemplary embodiment, mitigating the possible SLA violation can comprise resolving a possible confliction between performance requirements and security requirements.

In an exemplary embodiment, the plurality of tenants can include all tenants of the cloud provider.

In an exemplary embodiment, the enforcements of SLAs can be monitored by retrieving information about enforcements of SLAs from other systems.

In an exemplary embodiment, the possible SLA violation can be mitigated by causing the cloud manager to adjust resources in the cloud of the cloud provider. For example, adjusting resources can comprise allocating additional resources to the one tenant by adjusting resources allocated to the other tenants of the plurality of tenants. Alternatively or additionally, the possible SLA violation is mitigated by causing the security management system to adjust security functions in the cloud of the cloud provider. For example, adjusting the security functions can comprise adjusting configurations for security-related services of the one tenant, so as to facilitate an allocation of additional resources for performance SLAs.

In an exemplary embodiment, the method can further comprise sending an alert to the tenant in case where the possible SLA violation is not mitigated successfully. Sending an alert can comprises triggering the tenant to take an appropriate action to mitigate the possible SLA violation.

According to a second aspect of the present invention, a method comprises receiving an information about changes in capabilities of a cloud provider for supporting security of services; and transmitting a SLA update indicating the changes to at least one tenant of the services, so as to enable the at least one tenant to adjust the services based on the changes. In an exemplary embodiment, the changes lie in an availability of an additional security function of the cloud provider. In an exemplary embodiment, the method further comprises receiving information about changes in capacities of a cloud provider for resource allocation.

According to a third aspect of the present invention, a method comprises receiving, at a device of a tenant, a SLA update indicating changes in capabilities of a cloud provider for supporting security of services; and transmitting information about the SLA update to a security management system of the tenant, to adjust the services based on the changes. Same for Cloud Management is missing According to a fourth aspect of the present invention, a method comprises receiving, at a device of a tenant, an information about changes in SLA requirements of the tenant from a security management system of the tenant; and transmitting a SLA update indicating the changes to a cloud provider of the tenant, so as to enable the cloud provider to adjust security-related services based on the changes.

According to a fifth aspect of the present invention, a method comprises receiving, from a device of a tenant, a SLA update indicating changes in SLA requirements of the tenant; and adjusting security-related services based on the SLA update. In an exemplary embodiment, the method can further comprise notifying a security management system of the cloud provider to adjust configurations for security-related services according to the SLA update. Alternatively or additionally, the method can further comprise notifying a cloud manager of the cloud provider to adjust resource allocations according to the SLA update.

According to a sixth aspect of the present invention, an apparatus comprises a first communication interface, configured to interact with a cloud manager of a cloud provider, to deploy SLAs to a cloud operation system of the cloud provider for resource allocations; and a second communication interface, configured to interact with a security management system, to deploy SLAs for configurations of physical and virtual security functions of the cloud provider.

In an exemplary embodiment, the first communication interface can be further configured to transmit to the cloud manager, a notification to adjust resources of a cloud of the cloud provider to mitigate a possible SLA violation for a tenant. In an exemplary embodiment, the first communication interface can be further configured to transmit to the cloud manager, a SLA update related to requirements of tenants of the cloud provider. In an exemplary embodiment, the first communication interface can be further configured to receive from the cloud manager, a SLA update related to capacities of the cloud provider.

In an exemplary embodiment, the second communication interface can be further configured to transmit to the security management system, a notification to adjust configurations for security-related services in the cloud of the cloud provider to mitigate a possible Service Level Agreement violation for a tenant. In an exemplary embodiment, the second communication interface can be further configured to transmit to the security management system, a SLA update related to security-related requirements of tenants of the cloud provider. In an exemplary embodiment, the second communication interface can be further configured to receive from the security management system, a SLA update related to security-related capabilities of the cloud provider. In an exemplary embodiment, the second communication interface can be further configured receive from the security management system, information for monitoring enforcement of a security-related SLA of a tenant.

In an exemplary embodiment, the apparatus can further comprise a third communication interface, configured to interact with tenants of the cloud provider to notify SLA-related states, for example an alert of an unsuccessful SLA-violation mitigation. The third communication interface be can further configured to transmit to a tenant, a SLA update related to capacity and/or security-related capabilities of the cloud provider. Alternatively, or additionally, the third communication interface be can further configured to receive from a tenant, a SLA update related to SLA requirements of the tenant. The third communication interface can be further configured to transmit at least part of SLAs of a tenant to the tenant. The third communication interface can be further configured to transmit to a tenant, information about monitoring enforcements of at least part of SLAs of the tenant, so that the tenant is capable of monitoring the at least part of SLAs.

According to a seven aspect of the present invention embodiment, an apparatus comprises at least one processor, and at least one memory including computer program code, the at least one memory and the computer program code configured to, with the at least one processor, cause, at least in part, the apparatus to perform one of the methods discussed above.

According to an eighth aspect of the present invention, a computer-readable storage medium carrying one or more sequences of one or more instructions which, when executed by one or more processors, cause, at least in part, an apparatus to perform one of the methods discussed above.

According to a ninth aspect of the present invention, an apparatus comprises means for performing one of the methods discussed above.

According to a tenth aspect of the present invention, a computer program product including one or more sequences of one or more instructions which, when executed by one or more processors, cause an apparatus to at least perform one of the methods discussed above.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details may be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION OF THE INVENTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. It is apparent to one skilled in the art that the embodiments of the invention may be practiced without these specific details or with an equivalent arrangement. In other instances, well-known structures and devices are shown in block diagram form in order to avoid unnecessarily obscuring the embodiments of the invention. Like reference numerals refer to like elements throughout.

As used herein, the terms "data", "content", "information", and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium", which refers to a non-transitory physical storage medium (e.g., volatile or non-volatile memory device), can be differentiated from a "computer-readable transmission medium", which refers to an electromagnetic signal.

Figure 1:
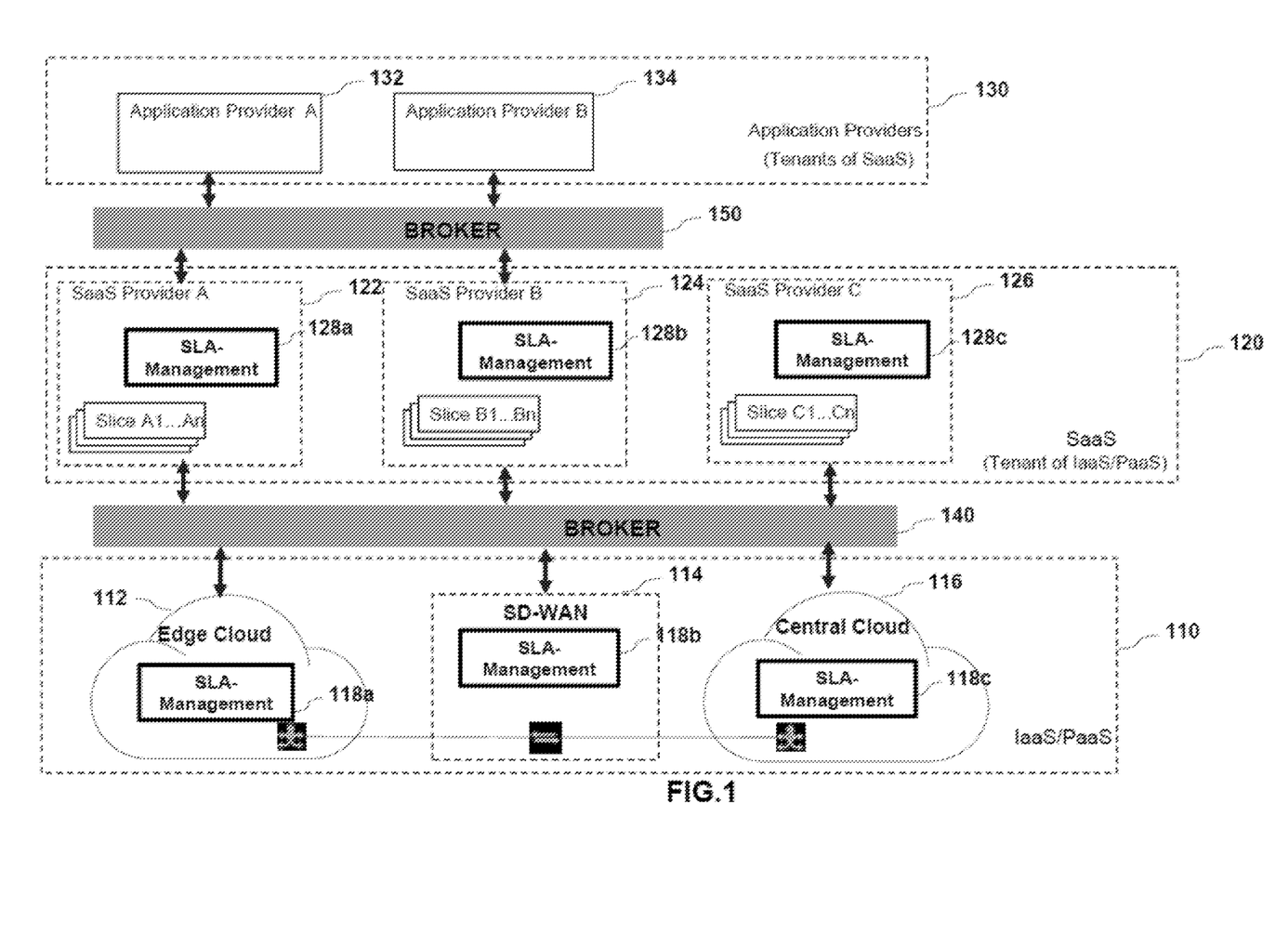
FIG. 1 illustrates an exemplary hierarchical architecture of a cloud environment capable of supporting at least some of embodiments of the present invention.

Referring now to FIG. 1, an exemplary hierarchical architecture of a cloud environment capable of supporting at least some of embodiments of the present invention is illustrated. As shown in FIG. 1, an architecture of cloud environments can be divided into multiple levels: Infrastructure as a Service (IaaS)/Platform as a Service (PaaS) layer 110, Software as a Service (SaaS) layer 120. The IaaS layer provides 'raw' machines (such as physical or virtualized servers, storage, networking and other devices), on which the service consumers can install their own software (usually as virtual machine images). The PaaS layer provides a development platform and environment providing services and storage, which is hosted in the cloud. The SaaS layer provides a pre-defined application as a service over the Internet or distributed environment.

In an example, IaaS/PaaS providers 112, 114, 116 provide resources of an Edge cloud, a SD-WAN (Software-Defined WAN) and Central cloud in IaaS/PaaS layer 110, respectively. SaaS providers 122, 124, 126 utilize resources, such as computer, storage as well as inter-datacenter connectivity and the like, from the IaaS and PaaS providers 112, 114, 116. In this regard, these SaaS providers 122, 124, 126 can be taken as tenants of the IaaS/PaaS providers 112, 114, 116. In an example, a SaaS provider can be a Telecom SaaS provider. In 4G and 5G, there may be a single IaaS provider, that hosts several Telecom SaaS providers as tenants on a shared infrastructure partitioned for isolation of tenants, called "cloud slices". Generally, the set-up, supervision and deletion of cloud slices are managed by dedicated logical functions.

In some cases, there may an upper layer 130 above the SaaS layer, which may utilize predefined applications, virtual networks provided by the SaaS layer, for offering services to end-consumers. For example, vertical business providers 132, 134 may be deployed in the layer 130. Verticals may offer services to end-consumers based on predefined applications, virtual networks provided by a Telecom SaaS provider. For example, a car maker may offer a "Jam Warning Backend" service and a "Map" service in layer 130. In this regard, these vertical business providers 132, 134 can be taken as tenants of the SaaS providers 122, 124, 126. Further, in 5G, Telecom SaaS providers may offer complete virtual networks (called "network slices"), which may be operated by tenants, such as the vertical business providers.

A "Broker" is deployed between tenants and cloud service provides, for orchestrating resources including a SLA-negotiation, to enable the collaboration between heterogeneous clouds. During a SLA-negotiation, requirements from tenants are mapped to constraints from service cloud providers, used to instantiate slices for resource allocation (such as instances, virtual private networks, and the like). Through the SLA-negotiation, tenants have the possibility to evaluate whether a certain cloud can meet their demands and to choose the most appropriate one.

As introduced above, security is a big concern in the future networks where additional resources are required to fulfill strict security requirements. Security-relevant SLAs are needed to address tenants' concerns regarding security of their services or data, e.g. measures against DDoS attacks, malware, response time to security incidents and so on. Accordingly, the on-demand deployment of cloud services will certainly apply to security, and require SLA definitions for security-relevant functions as well as means for tenants to control the state of the SLAs.

Cloud providers will be responsible to guarantee all tenants' SLAs. In this regard, any one of the IaaS/PaaS providers 112, 114, 116 is responsible to guarantee SLAs for all tenants' SaaS (including 122, 124, 126), as well as the SaaS provider is responsible to guarantee SLAs for all slices for tenants. Furthermore, the cloud providers have to mitigate SLA-violations before the tenants are affected, which is called a capacity of "self-healing".

However, in the current cloud environments, providers of public clouds offer limited and non-negotiable SLAs mostly related to availability and computation, e.g. Google, Amazon use SLA managements for specifying and monitoring quality of service and availability levels to their customers. Security-relevant SLAs are rare. At best, customers can select a region where the data should be stored and processed or choose a SSL connection. But there is no mechanism for customer to monitor those SLAs.

In general, a current cloud management system enforces SLAs by dynamically allocating available resources to cloud services and monitoring the software and physical cloud resources to maintain the conditions defined in the SLAs. Those SLAs are static and refer to resource requirements, e.g. Nokia Cloud Band Infrastructure Software (CBIS). Today, management activities related to security have not been expressed as SLAs. Thus, traditionally, an integrated SLA management for performance and security requirements, including the resolution of SLA conflicts therebetween, is not in the scope of cloud providers.

According to the present invention, a new logical management entity, called "SLA-Management", is proposed for performing SLA managements automatedly in distributed cloud environments, for example including Telecom and IT IaaS, PaaS and SaaS clouds as well as other clouds. The SLA-Management entity can perform an integrated SLA management for both performance requirements and security requirements. In additional, the SLA-Management entity is capable of resolving conflict between performance requirements and security requirements, and mitigating possible SLA violations automatically.

In some exemplary embodiments, the SLA-Management entity is deployed in each layer of the cloud environments. For example, as shown in FIG. 1, each cloud provider has its own SLA-Management entity. For a tenant, it can have a SLA-Management entity if it's also XaaS provider. Data and information of SLA-related procedures, such as various SLAs, specifications of SLA requirements, SLA constraints and so on, can be exchanged automatically between a SLA-Management entity of a cloud provider and respective SLA-Management entities of respective tenants of the cloud provider, across layers without via a broker. The SLA-related procedures may include a SLA definition, a SLA negotiation, SLA monitoring, detection and mitigation of SLA violations, SLA conflict management and SLA update. For example, the SLA-Management entity 118a of an Edge cloud provider 112 can interact with SLA-Management entities 128a, 128b, 128c of its multiple tenants 122, 124, 126, respectively. In another aspect, a SLA-Management entity of a tenant can interaction with respective SLA-Management entity of its multiple cloud providers. For example, the SLA-Management entity 128a can interact (not shown) with SLA-Management entities 118a, 118b, 118c, respectively.

In some embodiments, a SLA-Management entity of a cloud provider can interact with SLA-Management entities of all of its tenants. Then, the cloud provider may be able to supervise and manage the various SLA requirements and enforcement states of SLAs for all of its tenants, and leverage and optimize a resource allocation automatically even without affecting its tenants, during deployment and run-time of the service.

According to the present invention, a SLA-Management entity of a service provider also interacts with other management system/functional entities of the cloud provider, including a security management system and a cloud manager. The interactions between the SLA-Management entity and its connected management entities/system are related to an automated SLA-handling during deployment and run-time of a service, including the automated reaction on possible SLA violations for self-healing purposes. That means the SLA violations can be mitigated before the tenants are affected. Furthermore, a confliction between strict performance requirements and strict security demands from a tenant during deployment and/or run-time of a service can be resolved, through cooperation between the SLA-Management entity and its connected management entities/systems, which will be described in detail later.

Figure 2:
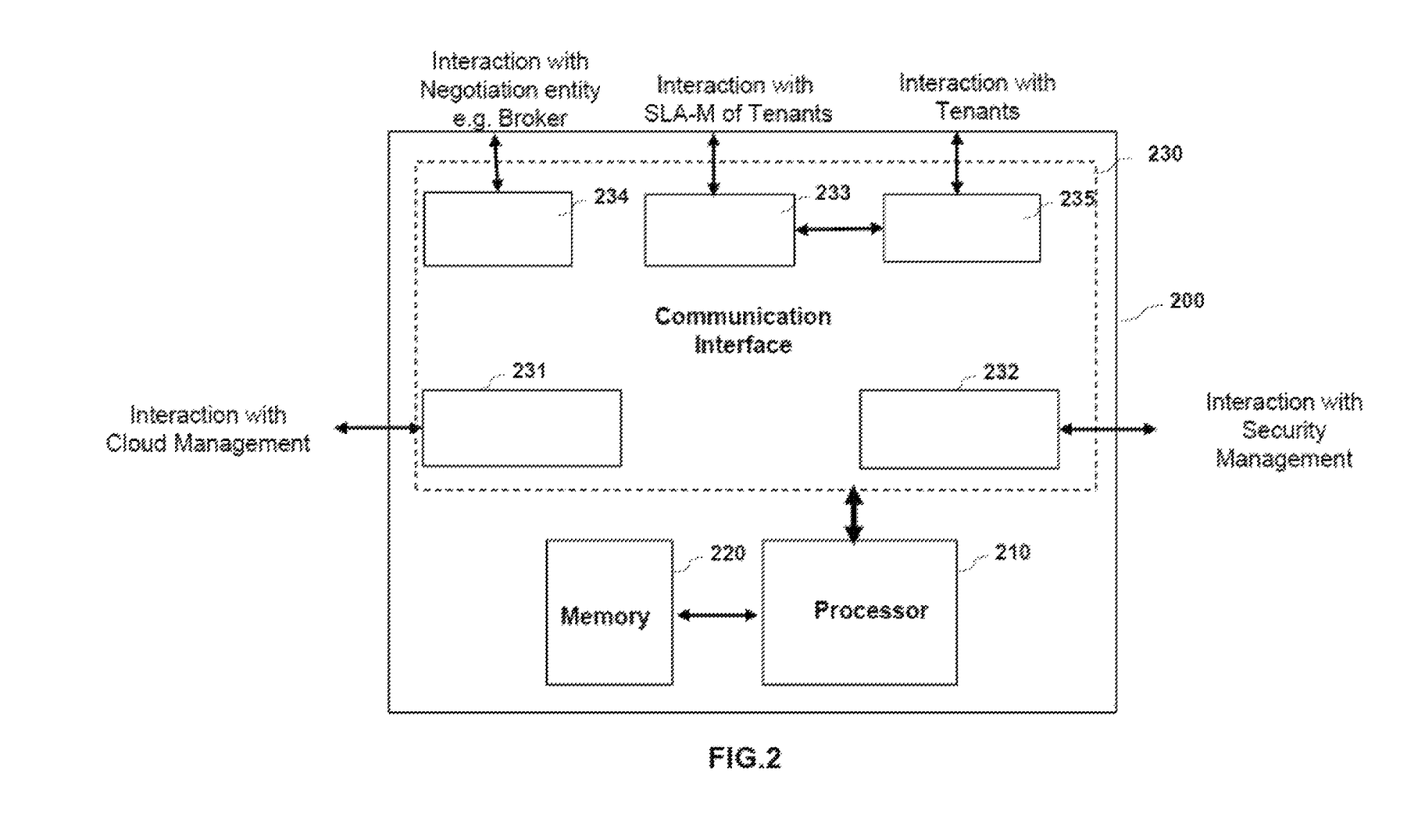
FIG. 2 illustrates an exemplary apparatus capable of supporting SLA managements according to at least some of embodiments of the present invention.

Now, reference is made to FIG. 2, which illustrates a schematic diagram of an SLA-Management entity 200 according to at least some of embodiments of the present invention. In some example embodiments, the SLA-Management entity 200 may be embodied as, or may be included as, a component of a device with wired or wireless communications capabilities, such as a component of a cloud manager. Regardless of the type of communications device, the SLA-Management entity 200 may also include computing capabilities.

As shown, the SLA-Management entity 200 includes or is otherwise in communication with a processor 210, a memory device 220, and a communication interface 230. The processor 210 may be embodied as various means for implementing the various functionalities of example embodiments of the present invention including, for example, a microprocessor, a coprocessor, a controller, a special-purpose integrated circuit such as, for example, an application specific integrated circuit (ASIC), a field programmable gate array (FPGA), or a hardware accelerator, processing circuitry or the like. According to one example embodiment, processor 210 may be representative of a plurality of processors, or one or more multiple core processors, operating in concert.

In some example embodiments, the processor 210 is configured to execute instructions stored in the memory device 220 or instructions otherwise accessible to the processor 210. Whether configured as hardware or via instructions stored on a non-transitory computer-readable storage medium, or by a combination thereof, the processor 210 may be an entity capable of performing operations according to example embodiments of the present invention while configured accordingly.

In some embodiments, the processor (and/or co-processors or any other processing circuitry assisting or otherwise associated with the processor) may be in communication with the memory device 220 via a bus for passing information among components of the apparatus. The memory device 220 may be one or more computer-readable storage media that may include volatile and/or non-volatile memory. In some example embodiments, the memory device 220 includes Random Access Memory (RAM) including dynamic and/or static RAM, on-chip or off-chip cache memory, and/or the like. Further, memory device 220 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 220 may include a cache area for temporary storage of data. In this regard, some or all of memory device 220 may be included within the processor 210.

Further, the memory device 220 may be configured to store information, data, applications, computer-readable program code instructions, and/or the like for enabling the processor 210 and the example apparatus 200 to carry out various functions in accordance with example embodiments of the present invention described herein. For example, the memory device 220 could be configured to buffer input data for processing by the processor 210. Additionally, or alternatively, the memory device 220 may be configured to store instructions for execution by the processor 210.

The communication interface 230 may be any device or means embodied in either hardware, a computer program product, or a combination of hardware and a computer program product that is configured to receive and/or transmit data from/to a cloud and/or any other device or entity in communication with the example SLA-Management entity 200. Via the communication interface 230, the example SLA-Management entity 200 may communicate with various other device or entity of cloud environments, in a device-to-device fashion and/or via indirect communications via a base station, access point, server, gateway, router, or the like.

In some example embodiments, the communications interface may be part of, or include, a wireless modem connected to a computer. Processor 210 may also be configured to facilitate communications via the communications interface by, for example, controlling hardware included within the communications interface 230. In this regard, the communication interface 230 may include, for example, one or more antennas, a transmitter, a receiver, a transceiver and/or supporting hardware, including, for example, a processor for enabling communications.

Additionally or alternatively, the communication interface 230 may include the circuitry for interacting with the antenna(s) to cause transmission of signals via the antenna (s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Based on functions performed in SLA management operations, the communication interface 230 can be divided into five parts, each of which is assigned to interact with different function entities or objects. As shown in FIG. 2, a first communication interface 231 is configured to interact with a cloud manager, to deploy SLAs to a cloud operation system of the cloud provider with resource allocations. In an example, the cloud manager may be ETSI (Network Functions Virtualisation Industry Specification Group) NFV (Network Functions Virtualisation) VIM (Virtualised Infrastructure Manager), or Network Slice Orchestrator in SaaS. In some embodiments, via interactions through the first communication interface 231, the SLA-Management entity 200 can cooperate with the cloud manager to adapt resources as a mitigation strategy in case of possible SLA violations.

In some embodiments, information about SLA updates can be exchanged between a cloud provider and its tenants by virtue of the first communication interface 231. In an example, via the first communication interface 231, the SLA-Management entity 200 can inform the cloud manager of a SLA update related to requirements of its tenants, such as changes in performance requirements and/or security requirements. Additionally or alternatively, via the first communication interface 231, the SLA-Management entity 200 can be informed of a SLA update related to capacities of the cloud provider, such as changes in available resources. Such exchanging of the SLA update can be done directly between the cloud service provider and its tenants, without needs for re-negotiation as done in a traditional SLA management by a broker, for example.

A second communication interface 232 is provided to interact with a security management system, to deploy SLAs for configurations of physical and virtual security functions (e.g. PSFs, VSFs) of the cloud provider. In an example, the security management system may be ETSI NFV Security Orchestrator. Via the second communication interface 232, a SLA-Management entity of a cloud provider can retrieve information relation to enforcements of security SLAs from the security management system of the cloud provider. Through interactions through the second communication interface 232, the SLA-Management entity 200 can cooperate with the security management system to reconfigure security functions, such as scale up/down configurations of PSFs and VSFs, as a reaction on possible SLA violations.

In some embodiments, information about security-related SLA update can be exchanged between a cloud provider and its tenants by virtue of the second communication interface 232. In an example, the SLA-Management entity 200 can inform a security management system of SLA updates related to security-related requirements of its tenants via the second communication interface 232. Additionally or alternatively, via the second communication interface 232, the SLA-Management entity 200 can be informed of updates of security-related SLA constraints of the cloud provider, such as changes in the configured PSFs or VSFs. Such exchanging of the updates of security-related SLAs can be done directly between the cloud service provider and its tenants, without needs for re-negotiation as done in a traditional SLA management by a broker, for example.

A third communication interface 233 is provided to interact with SLA-Management entities in other clouds of a different layer. In this regard, SLA-Management entities of tenants of a cloud provider are deployed in a cloud of a layer different from that of the cloud provider. For example, as shown in the architecture in FIG. 1, there is a tenant's cloud from a SaaS provider. In one hand, a SLA-Management entity of a cloud provider can interact with its tenants in an upper layer via the third communication interface. In the other hand, a SLA-Management entity of a tenant can interact with its cloud service providers in a lower layer via the third communication interface. In some embodiments, in a case where a SLA violation could not be resolved for a tenant, an alert of a SLA violation can be transmitted to the tenant or a SLA-Management entity of the tenant via the third communication interface 233, for example during run-time of a service. The alert may be used as a trigger for a further SLA-violation mitigation, e.g. scaling out to a cloud or slice of another cloud provider or even updating tenants' SLAs.

In some embodiments, information about SLA updates can be exchanged between a cloud provider and its tenants via a third communication interface 233. By virtue of this third communication interface, SLA managements can be executed across multi-layers in cloud environments. In an example, through the third communication interface 233, the SLA-Management entity 200 can receive an update of SLA specifications related to requirements of a tenant, such as changes in performance requirements and/or security requirements. Accordingly, the update of SLA specifications can be transmitted from the tenant via a corresponding communication interface in a SLA-Management entity of the tenant. Additionally or alternatively, through the third communication interface 233, the SLA-Management entity 200 can transmit to SLA-Management entities of the tenants, updates of SLA constraints of a cloud provider, such as changes in the configured resources, configured PSFs or VSFs, or the like. Accordingly, the update of SLA constraints can be received by a tenant via a corresponding communication interface in a SLA-Management entity of the tenant. Such exchanging of the SLA updates can be done automatically between the cloud provider and its tenants, without needs for re-negotiation as done in a traditional SLA management by a broker, for example.

In some embodiments, the third communication interface 233 may also support the automated provisioning of tenants' SLAs as well as the SLA monitoring capabilities to the tenants. In this regard, a SLA-Management entity of a tenant can transmit SLAs of the tenant to a SLA-Management entity of a cloud provider automatically, through a third communication interface 233. Furthermore, a SLA-Management entity of a cloud provider can transmit information about monitored enforcements of SLAs to the SLA-Management entity of a tenant, so that the tenant is capable of monitoring its SLAs.

A fourth communication interface 234 is provided to interact with an entity responsible for SLA-negotiation, such as a broker. In a SLA-negotiation procedure, SLA specifications of tenants and SLA constraints of the cloud provider can be provided respectively to a broker, via their respective fourth communication interfaces. After the SLA-negotiation, SLA contracts can be transmitted to the respective SLA-Management entities and stored in respective memory devices. For example, the SLA specifications comprise requirements in aspects of security, performance KPI, costs, and the like.

A fifth communication interface 235 is provided to interact with tenants for human intervention. For example, the fifth communication interface 235 may be used by administrators of the tenants to deploy tenants' SLAs manually and monitor SLAs.

In some embodiments, the SLA-Management entity 200 may be a software package structured accordingly to perform the SLA Management related tasks according to workflows defined according to the present invention. In some embodiments, the SLA-Management entity 200 may be implemented as a separate logical management entity, or logical functions integrated in management systems of a cloud provider or tenants, including cloud managers and/or security management systems.

Figure 3:
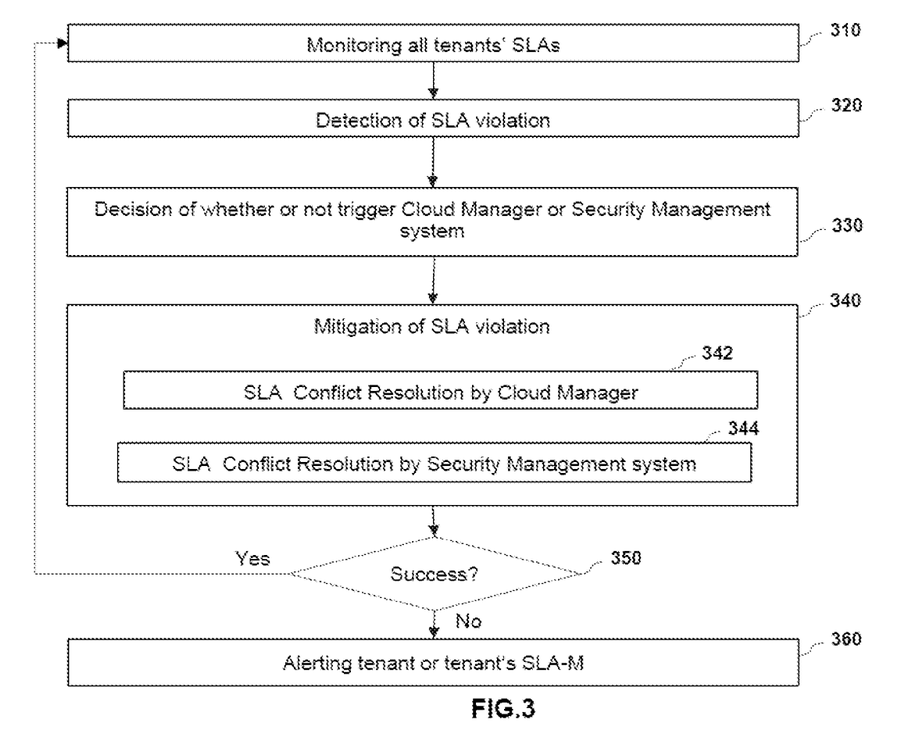
FIG. 3 is a flow chart of an exemplary process for SLA managements according to at least some of embodiments of the present invention.

FIG. 3 illustrates an example workflow for SLA managements, for example performed by a SLA-Management entity 200 of a cloud provider. As shown in block 310, a cloud provider is monitoring enforcements of SLAs of all tenants. A SLA-Management entity of a cloud provider can monitor all kinds of SLAs, for solving the confliction between them (as described later). For example, parts of the monitored SLAs may be in relation to performance of services of the tenants provided by the cloud provider, and are referred to as performance SLAs in this description. Parts of the monitored SLAs may be in relation to security of services of the tenants provided by the cloud provider, and are referred to as security SLAs in this description. It can retrieve information about enforcements of all SLAs, such as security, performance, high availability related SLA, etc. from the security management system, cloud management system and other systems. Then the cloud provider may detect a possible SLA violation for one or more tenant, e.g. a violation of performance SLAs, security SLAs, costs, etc., as shown in block 320.

In an example, the SLA-Management entity 200 can collect usage states of resources of all tenants, for example in real-time or periodically. For example, the SLA-Management entity 200 can retrieve various performance KPIs (Key performance Indicator) such as WEP requests handled per second, request latency and the like, from various relevant systems, such as a cloud manager of the cloud provider, and then compares them against corresponding SLA specifications. If a current performance KPI is lower than a threshold, it can be determined that a SLA violation is probably to occur if things go on without a change. In some embodiments, the SLA-Management entity 200 can retrieve information relation to enforcements of security SLAs from a security management system of the cloud provider.

In some embodiments, the SLA violation is caused by a confliction between a performance requirement and a security requirement. For example, a possible latency violation may occur for a tenant due to a deployment of an additional IDS (Intrusion Detection Systems) VNF (Virtual Network Function) for the tenant. Traffic congestion may be happened as lack of processing resources after deploying the additional IDS VNF, and hence a latency of service provision may extend beyond a threshold. In an example, after deploying the additional IDS VNF, a security management system may inform a SLA-Management entity to detect whether a possible SLA violation occurs. In another example, the deployment of the additional IDS VNF may be triggered by a SLA-Management entity, and consequently the SLA-Management entity would detect whether a possible SLA violation occurs. However, it should be appreciated that a SLA-violation can be caused by various reasons except the confliction between performance and security requirements. For example, a SLA violation may be caused by a security event or other incidents (like faults), mitigating attacks, topology changes due to re-configurations, and the like. A SLA-Management entity can be configured to detect and mitigate automatically all kinds of SLA violations. Depending on the types of the involved SLAs, different approaches are possible to detect SLA violations (e.g. algorithms, machine learning based methods).

As shown in block 330, when a possible SLA violation is detected, the SLA-Management entity can decide whether to trigger a cloud manager or a security management system of the cloud provider to mitigate the possible SLA violation. The kind of mitigation always depends on the capabilities and capacities of the cloud provider as well as on the defined methods to resolve conflicts between SLAs especially between performance and security requirements in the service provider's cloud. In an example, conflictions between the performance requirements and the security SLA requirements can be solved, when necessary, for self-healing purpose. Multiple methods are possible to resolve the conflicts between performance and security requirements, dependent on the types of the involved SLAs (e.g. by assigning different priorities, or defining meta-policies). In this example, the cloud provider can decide whether to trigger a cloud manager or a security management system to mitigate the SLA violation, for example, based on its capabilities, capacities and defined schemes for conflict resolution between SLAs. Depending on the types of involved SLAs and kind of violation, it could be necessary to cooperate with both.

According to the decision in block 330, the SLA-Management entity can automatically take actions to mitigate the possible violation, in cooperation with a cloud manager and/or a security management system. In an example, the cloud manager of the cloud provider can be triggered to adjust resources in the cloud, as shown in block 342. For example, the SLA-Management entity can cause a cloud manager to leverage resources of other tenants. In an example, the SLA-Management entity can inform the cloud manager to allocate additional resources to this tenant by scaling in/down the VNFs of other tenants. For example, a relevant notification can be transmitted from the SLA-Management entity to the cloud manager via a first communication interface. Accordingly, both the latency requirements and security requirements of this tenant may be fulfilled with the additional resources, and the conflict may be solved and the possible SLA violation may be mitigated.

Alternatively or additionally, security management system of the cloud provider can be triggered to adjust security functions in the provider's cloud, as shown in block 344. For example, the SLA-Management entity can cause a security management system to leverage resources of the same tenant. In an example, the SLA-Management entity can inform the security management system to scale in/down security VNFs of the same tenant, so that additional resources can be allocated to fulfill latency requirements of the tenant. For example, a relevant notification can be transmitted from the SLA-Management entity to the security management system via a second communication interface. In some embodiments, the leverage in resources of the same tenant can be performed when the violation mitigation does not success through the leverage in resources of other tenants.

When the violation mitigation does success, the workflow can go back to block 310 for continuing to monitor enforcements of SLAs. In the other hand, when the violation mitigation does not success, it means that the cloud provider couldn't self-heal the violation/confliction. Then, the cloud provider can alert the tenant's SLA-Management entity or alert the tenant (e.g. its administrator) to take appropriate actions, as shown in block 360.

In some embodiments, the conflict does not lie in cloud resources, but is a confliction between network connectivity and a security-related SLA requirement. In an example, there's an attack monitoring and detection functionality, such as IDS, deployed in a network of a cloud provider. Generally, routing polices (e.g. Meta-policies for resolution of conflicts) are defined according to latency and security SLAs for a tenant. A SLA-Management entity of the cloud provider may monitor the performance and security SLAs of the tenant. For example, in case of a WAN connection re-routing (e.g. triggered due to an incident), generally the traffic may be routed to have a connection with monitoring capabilities, e.g. to the IDS for an attack detection. However, a latency requirement may not be satisfied due to the re-routing, for example for some very low-latency requested traffics in some cases. As such, a possible SLA violation may be detected by the SLA-Management entity of the cloud provider.

In such embodiments, the SLA violation can be mitigated by adjusting the network connectivity. For example, the SLA-Management entity of the cloud provider may inform a network manager or a network controller to re-select relevant routes/connections based on predefined policies. For example, if the conflicted performance requirement is critical, a route without passing through IDS would be selected to fulfill the latency requirement. Otherwise if the conflicted security requirement is more important, a route with passing IDS would be selected and the performance is compromised. Alternatively and additionally, the SLA violation can be mitigated by adjusting configurations for security-related services. For example, the SLA-Management entity may inform a security management system to reconfigure the security function for the traffic, so as to enable a fast-path feature of the security function. As such, both security and performance SLAs can be satisfied.

If the network provider couldn't self-heal the violation/confliction, it will alert the tenant's SLA-Management entity to take appropriate actions. For example, the SLA-Management entity of the tenant can be trigged to perform a further SLA-violation mitigation, e.g. scaling out to a cloud or slice of another cloud provider or even updating tenants' SLAs As described above, FIG. 3 illustrates a flowchart of an apparatus, method, and computer program product according to example embodiments of the invention from the perspective of a SLA-Management entity in a provider. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture; the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Figure 4:
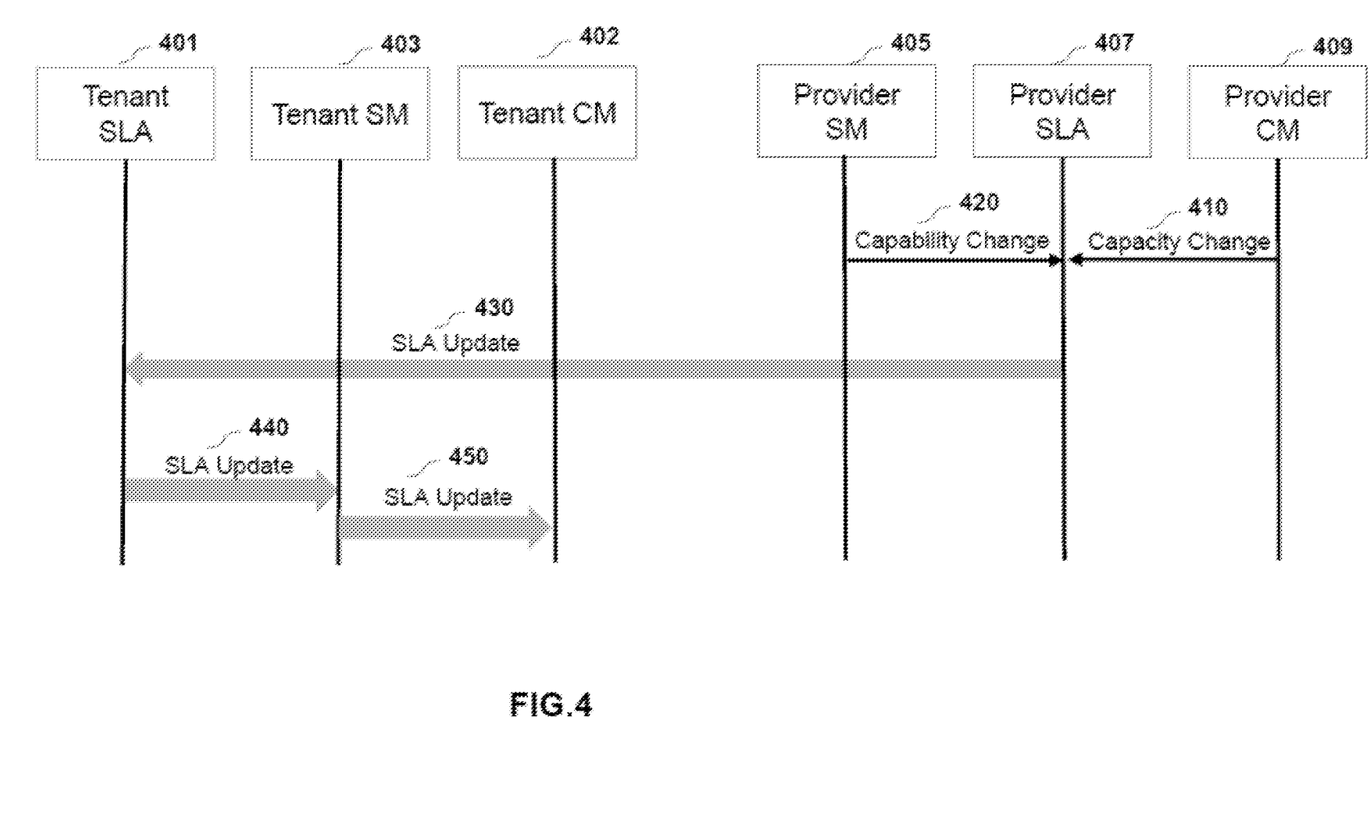
FIG. 4 is a signaling flow diagram depicting a procedure for updating SLAs according to at least some of embodiments of the present invention.
Figure 5:
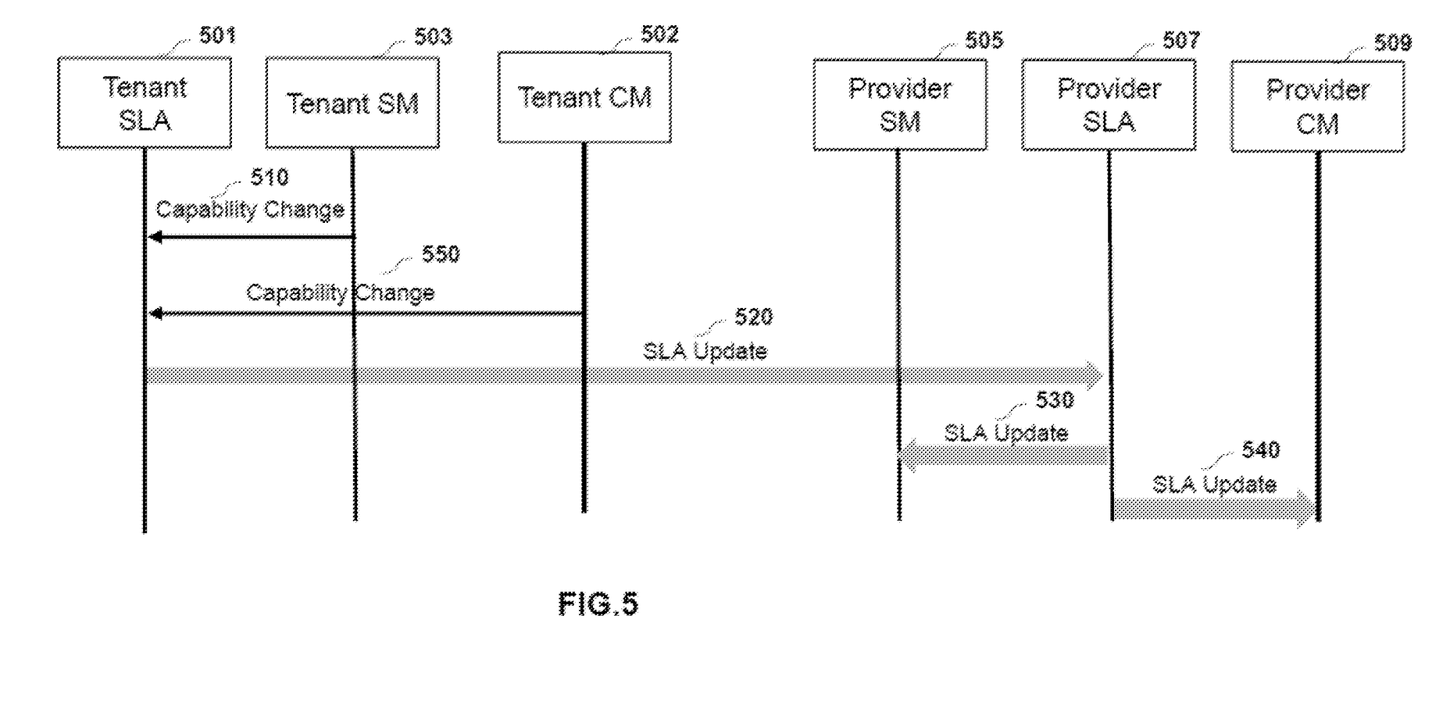
FIG. 5 is another signaling flow diagram depicting a procedure for updating SLAs according to at least some of embodiments of the present invention.

FIGS. 4 and 5 illustrate signaling flow diagrams depicting procedures for updating SLA according to at least some of embodiments. In some embodiments, a SLA-Management entity can maintain SLA specifications of requirements for the performance and security of the services of tenants, and SLAs constrains associated with capabilities and capacities of a cloud provider for supporting the performance and security of services. In the procedures, new communication interfaces are used to automatically update SLAs without SLA re-negotiations. For example, a change in security-related capabilities of a cloud provider (denoted as Provider SM 405, 505 in the figures) can be deploying a security VNF to satisfy a new regulation. A change in capacities of a cloud provider (denoted as Provider CM 409, 509) can be decreasing free CPU/memory, etc. because of introducing a new security function, for example. A change in security-related capabilities of a tenant (denoted as Tenant SM 403, 503) can be a requirement of security function for a new regulation, a new type of events, or new security function/features required by its own tenants.

FIG. 4 illustrates an exemplary procedure of SLA update triggered by a cloud provider. At 410, a SLA-Management entity 407 of a cloud provider is informed of a capacity change of the cloud provider. In an example, the cloud provider added one physical server, and then the virtual resource capacity like vCPU/vMemory of the infrastructure was increased. Information of the capacity change can be received by the SLA-Management entity 407 via a first communication interface as introduced above with reference to FIG. 2.

At 420, the SLA-Management entity 407 is informed of a security-related capability change of the cloud provider. In an example, the cloud provider deployed a new security VNF for vulnerability scanning according to a new regulation, and then its security capability was enhanced. For example, information of the capability change can be received by the SLA-Management entity 407 via a second communication interface as introduced above with reference to FIG. 2.

At 430, the provider's SLA-Management entity 407 notifies a SLA-Management entity 401 of a tenant of a performance-related SLA update and/or a security-related SLA update according to the capability change and the capacity change of the provider. For example, Information of the capability change and the capacity change can be transmitted from the provider via a third communication interface in the SLA-Management entity 407, and received by the tenant via a third communication interface in the SLA-Management entity 401, as introduced above with reference to FIG. 2.

Then at 440, the tenant's SLA-Management entity 401 can inform a security management system of the tenant (denoted as Tenant SM 403) of a security-related SLA update according to the capability change and the capacity change of the provider, so as to enable the tenant to adjust its services based on the update. For example, the SLA-Management entity 401 can notify the Tenant SM 403 that a new security function is supported by the cloud provider now. Information of the security-related SLA update can be transmitted to the Tenant SM 403 via a second communication interface in the SLA-Management entity 401 as introduced above with reference to FIG. 2. Then, the Tenant SM 403 could use the new function for vulnerability scanning. At 450, the tenant's SLA-Management entity 401 can inform a cloud manager of the tenant (denoted as Tenant CM 402) of a SLA update according to the capability change and the capacity change of the provider, so as to enable cloud manager of the tenant to optimize services for the tenant based on the update.

FIG. 5 illustrates an exemplary procedure of SLA update triggered by a tenant. At 510, a security management system of a tenant (denoted as Tenant SM 503) sends a new security-related SLA requirement to a SLA-Management entity 501 of the tenant. In an example, the tenant needs to monitor a new type of security event based on a regulation requirement or requirements from its own tenant, and then the Tenant SM 503 notifies the SLA-Management entity 501 of that new SLA requirement. Related information can be received by the SLA-Management entity 501 via a second communication interface in the SLA-Management entity 501 as introduced above with reference to FIG. 2.

The SLA-Management entity 501 syncs the new SLA requirement with a provider, so as to enable the provider to adjust security-related services accordingly. In an example, as shown at 520, the SLA-Management entity 501 transmits a SLA update indicating the new SLA requirement to a SLA-Management entity 507 of the provider. Information of the SLA update can be transmitted from the tenant via a third communication interface in the SLA-Management entity 501, and received by the provider via a third communication interface in the SLA-Management entity 507, as introduced above with reference to FIG. 2.

Then at 530, the SLA-Management entity 507 can notify a security management system to adjust configurations for security-related services according to the SLA update. In an example, the SLA-Management entity 507 would ask the Provider SM 505 to subscribe the tenant to monitor the event, if the monitoring function supports the new type of event. For example, information of such SLA update can be transmitted by the SLA-Management entity 507 to the security management system of the provider via a second communication interface as introduced above with reference to FIG. 2. In some embodiments, the Tenant SLA can be informed by a cloud manager of the tenant (denoted as 502) when the tenant is required to support more/less services and related SLA requirements can be changed, as shown at 550.

Alternatively, the SLA-Management entity 507 can notify a cloud manager of the cloud provider to adjust resource allocations according to the SLA update, as shown at 540. In an example, the SLA-Management entity 507 would ask the Provider CM 509 to allocate resources and deploy the new monitoring function to support the event, if there are enough resources. For example, information of such SLA update can be transmitted by the SLA-Management entity 507 via a first communication interface as introduced above with reference to FIG. 2.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method, comprising:
retrieving, from one or more other systems, information about enforcement of Service Level Agreements for services provided to a plurality of tenants by a cloud provider, wherein the Service Level Agreements are related to performance of the services and security of the services;
detecting a possible Service Level Agreement violation for a service provided to one tenant of the plurality of tenants, wherein the possible Service Level Agreement violation is caused by a confliction between performance requirements and security requirements;
deciding between a cloud manager, a security management system and a combination of the cloud manager and the security management system, of the cloud provider of the service, for triggering to mitigate the possible Service Level Agreement violation; and,
mitigating the possible Service Level Agreement violation with cooperation of the cloud manager, the security management system, or the combination of the cloud manager and the security management system, of the cloud provider based on the deciding.

2. The method according to claim 1, wherein mitigating the possible Service Level Agreement violation further comprises resolving the confliction between the performance requirements and the security requirements.

3. The method according to claim 1, wherein deciding between the cloud manager, or the security management system or the combination of the cloud manager and the security management system, of the cloud provider for triggering to mitigate the possible Service Level Agreement violation is performed based on capabilities and capacities of the cloud provider and defined schemes for conflict resolution between the Service Level Agreements.

4. The method according to claim 1, wherein mitigating the possible Service Level Agreement violation further comprises:
    causing the cloud manager to adjust resources in the cloud of the cloud provider.

5. The method according to claim 4, wherein adjusting the resources further comprises allocating additional resources to the one tenant by adjusting resources allocated to the other tenants of the plurality of tenants.

6. The method according to claim 1, wherein mitigating the possible Service Level Agreement violation further comprises:
    causing the security management system to adjust security functions in the cloud of the cloud provider.

7. The method according to claim 6, wherein adjusting the security functions further comprising adjusting configurations for one or more security-related services of the one tenant, so as to facilitate an allocation of additional resources for performance Service Level Agreements.

8. The method according to claim 7, wherein sending the alert further comprises:
    triggering the one tenant to take an appropriate action to mitigate the possible Service Level Agreement violation.

9. The method according to claim 1, wherein the possible Service Level Agreement violation is caused by a possible confliction between a network connectivity of the tenant and the security requirements, and wherein mitigating the possible Service Level Agreement violation further comprises causing the cloud manager to adjust the network connectivity.

10. The method according to claim 1, further comprises:
    sending an alert to the one tenant when the possible Service Level Agreement violation is not mitigated successfully.

11. The method according to claim 1, wherein the plurality of tenants includes all tenants of the cloud provider.

12. An apparatus comprising:
    at least one processor; and
    at least one memory including computer program code,
    the at least one memory and the computer program code configured to, with the at least one processor, cause the apparatus to perform at least the following:
    retrieve, from one or more other systems, information about enforcements of Service Level Agreements for services provided to a plurality of tenants by a cloud provider, wherein the Service Level Agreements are related to performance of the services and security of the services;
    detect a possible Service Level Agreement violation for a service provided to one tenant of the plurality of tenants, wherein the possible Service Level Agreement violation is caused by a confliction between performance requirements and security requirements;
    decide between a cloud manager, a security management system and a combination of the cloud manager and the security management system, of the cloud provider of the service,. for triggering to mitigate the possible Service Level Agreement violation; and,
    mitigate the possible Service Level Agreement violation with cooperation with the cloud manager, the security management system or the combination of the cloud manager and the security management system, of the cloud provider based on deciding between a cloud manager, a security management system and a combination of the cloud manager and the security management system.

13. The apparatus of claim 12, wherein the plurality of tenants includes all tenants of the cloud provider.

14. The apparatus according to claim 12, wherein mitigate the possible Service Level Agreement violation further comprises to resolve the confliction between the performance requirements and the security requirements.

15. The apparatus of claim 12, wherein deciding between the cloud manager, the security management system and the combination of the cloud manager and the security management system, of the cloud provider to mitigate the possible Service Level Agreement violation is performed based on capabilities and capacities of the cloud provider and defined schemes for conflict resolution between the Service Level Agreements.

16. The apparatus of claim 12, wherein mitigate the possible Service Level Agreement violation further comprises to cause the security management system to adjust security functions in the cloud of the cloud provider.

17. The apparatus of claim 16, wherein adjust security functions further comprises to adjust configurations for one or more security-related services of the one tenant, so as to facilitate an allocation of additional resources for performance Service Level Agreements.

18. The apparatus of claim 12, wherein the possible Service Level Agreement violation is caused by a possible confliction between a network connectivity of the tenant and the security requirements, and wherein mitigate the possible Service Level Agreement violation further comprises cause the cloud manager to adjust the network connectivity.

19. The apparatus of claim 12, wherein the apparatus is further caused to send an alert to the one tenant in case where the possible Service Level Agreement violation is not mitigated successfully.

20. The apparatus of claim 19, wherein send an alert further comprises:
    trigger the one tenant to take an appropriate action to mitigate the possible Service Level Agreement violation.

21. The apparatus of claim 12, wherein mitigate the possible Service Level Agreement violation further comprises to cause the cloud manager to adjust resources in the cloud of the cloud provider.

22. The apparatus of claim 21, wherein adjust the resources further comprises to allocate additional resources to the one tenant by adjusting resources allocated to the other tenants of the plurality of tenants.

23. A non-transitory computer-readable storage medium comprising program instructions stored thereon for performing at least the following:
    retrieving information about enforcement of Service Level Agreements for services provided to a plurality of tenants by a cloud provider, wherein the Service Level Agreements are related to performance of the services and security of the services;
    detecting a possible Service Level Agreement violation for a service provided to one tenant of the plurality of tenants, wherein the possible Service Level Agreement violation is caused by a confliction between performance requirements and security requirements; and,
    deciding between a cloud manager, a security management system and a combination of the cloud manager and the security management system, of the cloud provider of the service, for triggering to mitigate the possible Service Level Agreement violation.

\* \* \* \* \*